US009563765B2

(12) United States Patent
Post et al.

(10) Patent No.: US 9,563,765 B2
(45) Date of Patent: Feb. 7, 2017

(54) BASEBAND SECURE BOOT WITH REMOTE STORAGE

(71) Applicant: Apple Inc., Cupertino, CA (US)

(72) Inventors: Samuel D. Post, San Jose, CA (US); Onur E. Tackin, Cupertino, CA (US); Yannick L. Sierra, San Francisco, CA (US); Peng Liu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 14/632,917

(22) Filed: Feb. 26, 2015

(65) Prior Publication Data

US 2016/0232343 A1    Aug. 11, 2016

Related U.S. Application Data

(60) Provisional application No. 62/114,460, filed on Feb. 10, 2015.

(51) Int. Cl.

| G06F 7/04 | (2006.01) |
|---|---|
| G06F 12/14 | (2006.01) |
| G06F 17/30 | (2006.01) |
| G11C 7/00 | (2006.01) |
| G06F 21/44 | (2013.01) |

(Continued)

(52) U.S. Cl.
CPC ............ *G06F 21/44* (2013.01); *G06F 9/4401* (2013.01); *G06F 21/57* (2013.01); *H04W 40/06* (2013.01); *G06F 21/572* (2013.01); *G06F 21/575* (2013.01)

(58) Field of Classification Search
CPC ........ G06F 21/44; G06F 9/4401; G06F 21/57; G06F 21/572; G06F 21/575; H04W 40/06
See application file for complete search history.

(56) References Cited

U.S. PATENT DOCUMENTS

| 7,194,619 B2* | 3/2007 | Abbondanzio | ....... G06F 21/575 709/222 |
|---|---|---|---|
| 2005/0149730 A1* | 7/2005 | Aissi | ....... G06F 21/31 713/168 |

(Continued)

OTHER PUBLICATIONS

"SWATT: SoftWare-based attestation for embedded devices", A. Seshadri, IEEE Symposium—Security and Privacy, 2004.*

*Primary Examiner* — Jayesh Jhaveri
(74) *Attorney, Agent, or Firm* — Meyertons, Hood, Kivlin, Kowert & Goetzel, P.C.

(57) ABSTRACT

In order to simplify and reduce the cost of an electronic device, the size of a first non-volatile memory associated with an integrated circuit is significantly reduced. Instead of using the first non-volatile memory, a second non-volatile memory associated with a processor in the electronic device is used to store an embedded operating system of the integrated circuit, as well as associated data and a configuration of the integrated circuit. To reduce the security risks associated with using this remote second non-volatile memory, the first non-volatile memory may store authorization information and anti-replay information. During a secure boot of the integrated circuit, the authorization information is used to verify that the embedded operating system, the data and the configuration are authorized. In addition, the anti-replay information is used to determine that the embedded operating system, the data and the configuration are different than previously received versions of these items.

20 Claims, 8 Drawing Sheets

(51) Int. Cl.
  *H04W 40/06*   (2009.01)
  *G06F 9/44*    (2006.01)
  *G06F 21/57*   (2013.01)

(56) References Cited

U.S. PATENT DOCUMENTS

| | | | |
|---|---|---|---|
| 2006/0107329 A1* | 5/2006 | Frank | G06F 21/575 726/26 |
| 2009/0086981 A1* | 4/2009 | Kumar | G06F 21/575 380/285 |
| 2009/0222910 A1* | 9/2009 | Le Bihan | G06F 21/445 726/19 |
| 2012/0151223 A1* | 6/2012 | Conde Marques | G06F 21/6218 713/193 |
| 2012/0226895 A1* | 9/2012 | Anderson | G06F 21/575 713/2 |
| 2012/0266252 A1* | 10/2012 | Spiers | H04L 63/0218 726/26 |

* cited by examiner

BASEBAND SECURE BOOT WITH REMOTE STORAGE

CROSS-REFERENCE TO RELATED APPLICATIONS

This application claims priority under 35 U.S.C. §119(e) to U.S. Provisional Application Ser. No. 62/114,460, entitled "Baseband Secure Boot With Remote Storage," by Peng Liu, Samuel D. Post, Onur E. Tackin, and Yannick L. Siena, filed on Feb. 10, 2015, the contents of which are herein incorporated by reference.

BACKGROUND

Field

The described embodiments relate to techniques for securely booting an integrated circuit in an electronic device. More specifically, the described embodiments relate to techniques for securely booting a wireless-communication integrated circuit in an electronic device using a remote, non-secure memory.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard (which is sometimes referred to as 'Wi-Fi®') or Bluetooth® from the Bluetooth Special Interest Group of Kirkland, Wash.), and/or another type of wireless interface.

Many of the functions of the integrated circuit in the networking subsystem are performed by an embedded operating system. In existing electronic devices, this embedded operating system and the associated data is stored in memory that is associated with (and is proximate to) the integrated circuit. When the integrated circuit is turned on, the embedded operating system and the associated data are installed in the integrated circuit.

The use of dedicated memory associated with the integrated circuit can prevent security problems, such as the installation of corrupted or malicious code. However, the dedicated memory increases the cost and complexity of the electronic device.

SUMMARY

The described embodiments relate to an electronic device that includes: an antenna, and an integrated circuit that communicates with another electronic device via wireless communication using the antenna. This electronic device includes first non-volatile memory, electrically coupled to the integrated circuit, which stores authorization information and anti-replay information. The electronic device also includes: a processor electrically coupled to the integrated circuit, and second non-volatile memory electrically coupled to the processor. This second non-volatile memory stores: an embedded operating system of the integrated circuit, data associated with the integrated circuit, and a configuration of the integrated circuit. During a secure boot, the integrated circuit verifies that the embedded operating system, the data and the configuration are authorized using the authorization information, and determines that the embedded operating system, the data and the configuration are different than previously received versions based on the anti-replay information.

When verifying the authorization, the integrated circuit may compare credentials of the embedded operating system of the integrated circuit, the data, and the configuration to the authorization information.

Also, the first non-volatile memory may have a size less than a predefined threshold value, such as 1 kB.

Moreover, the anti-replay information may be based on a history of update files previously provided to the first non-volatile memory.

Furthermore, during a software update, the processor may receive the embedded operating system, the data and the configuration from another electronic device, and may forward the embedded operating system, the data and the configuration to the integrated circuit. Then, the integrated circuit may verify that the embedded operating system, the data and the configuration are authorized using the authorization information. Note that the integrated circuit may initiate the software update by providing a number to the processor. In addition, the number may be a random number, a value derived from the random number, a value from a monotonic counter, and/or a hash of the random number, and the number may only be used one time.

Another embodiment provides a computer-program product for use with the electronic device. This computer-program product includes instructions for at least some of the operations performed by the electronic device.

Another embodiment provides a method for securely booting the integrated circuit, which may be performed by the integrated circuit. During operation, the integrated circuit receives, from the second non-volatile memory associated with the processor, the embedded operating system of the integrated circuit, the data associated with the integrated circuit, and the configuration of the integrated circuit. Then, the integrated circuit verifies, using the authorization information stored in the first non-volatile memory associated with the integrated circuit, that the embedded operating system, the data and the configuration are authorized. The integrated circuit also determines, using the anti-replay information stored in the first non-volatile memory, that the embedded operating system, the data and the configuration are different from previously received versions.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Table 1 provides a partition layout in accordance with an embodiment of the present disclosure.

Table 2 provides a header in accordance with an embodiment of the present disclosure.

Table 3 provides an index table in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to simplify and reduce the cost of an electronic device, the size of a first non-volatile memory associated with an integrated circuit is significantly reduced. Instead, a second non-volatile memory associated with a processor in the electronic device (which is shared with the overall system in the electronic device) is used to store an embedded operating system of the integrated circuit, as well as associated data and a configuration of the integrated circuit. Moreover, to reduce the security risks associated with using this (unsecure or not trusted) remote second non-volatile memory, the first non-volatile memory may store authorization information and anti-replay information. During a secure boot of the integrated circuit, the authorization information is used to verify that the embedded operating system, the data and the configuration are authorized. In addition, the anti-replay information is used to determine that the embedded operating system, the data and the configuration are different from previously received versions of these items.

Note that the cost reduction of using the second non-volatile memory is because, unlike the first non-volatile memory, the second non-volatile memory can be shared with other parts of the overall system. In particular, the second non-volatile memory may include gigabytes of memory, using higher-density technologies. Therefore, the cost per byte of the second non-volatile memory may be much lower than that of the first non-volatile memory, which is dedicated. However, the use of the shared second non-volatile memory puts information in a different security perimeter. The disclosed security technique preserves the security of the processor in the integrated circuit so that it is comparable to a solution using an single and dedicated non-volatile memory.

In general, information communicated between the electronic device and another electronic device may be conveyed in packets that are transmitted and received by radios in the integrated circuit and in the other electronic device in accordance with a communication protocol, such as: an Institute of Electrical and Electronics Engineers (IEEE) 802.11 standard, Bluetooth® (from the Bluetooth Special Interest Group of Kirkland, Wash.), a cellular-telephone communication protocol and/or another type of wireless interface.

Figure 1:
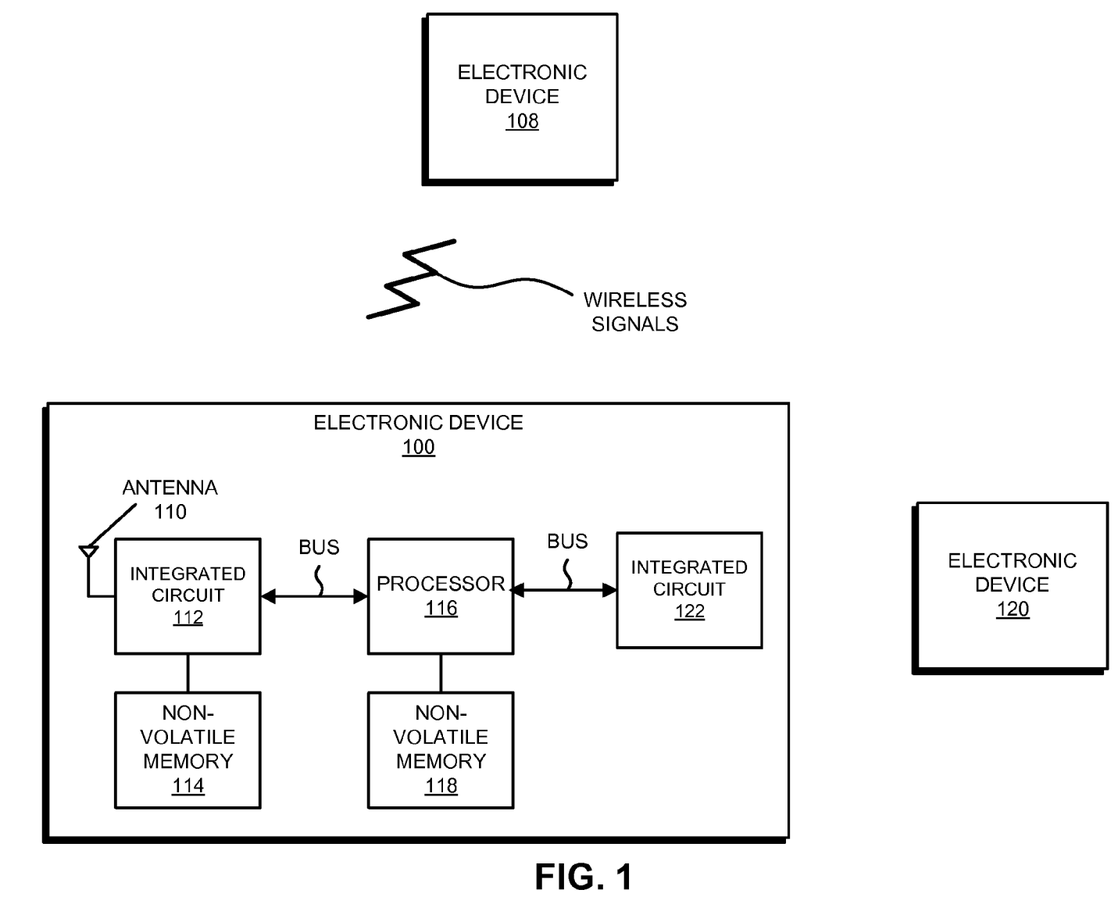
FIG. 1 is a block diagram illustrating an electronic device in accordance with an embodiment of the present disclosure.

FIG. 1 presents a block diagram illustrating an electronic device 100. This electronic device includes: at least one antenna 110, and an integrated circuit 112 that communicates with electronic device 108 via wireless communication of wireless signals using at least the one antenna 110. Moreover, electronic device 100 includes non-volatile memory 114 (such as EEPROM or another type of non-volatile memory), electrically coupled to integrated circuit 112, which stores authorization information and anti-replay information. Note that non-volatile memory 114 may have a size less than a predefined threshold value, such as 1 kB.

Furthermore, electronic device 100 includes: a processor 116 electrically coupled to integrated circuit 112, and non-volatile memory 118 (such as NOR/NAND flash or another type of non-volatile memory) electrically coupled to processor 116. Non-volatile memory 118 stores: an embedded operating system of integrated circuit 112, data associated with integrated circuit 112 (such as calibration data), and a configuration of integrated circuit 112. During a secure boot, integrated circuit 112 verifies that the embedded operating system, the data and the configuration are authorized using the authorization information, and determines that the embedded operating system, the data and the configuration are different from previously received versions based on the anti-replay information.

For example, when verifying the authorization, integrated circuit 112 may compare credentials (such as numerical values or alphanumeric characters) of the embedded operating system of the integrated circuit, the data, and the configuration to the authorization information. Moreover, the anti-replay information (such as numerical values or alphanumeric characters) may be based on a history of update files previously provided to non-volatile memory 114. Then, to verify that received information is not a replay attack, integrated circuit 112 may compare version information of the embedded operating system of integrated circuit 112, the data, and the configuration to the anti-replay information.

Furthermore, during a software update, processor 116 may receive, via wired or wireless communication using integrated circuit 122, the embedded operating system, the data and the configuration from another electronic device 120 (such as a server), and may forward the embedded operating system, the data and the configuration to integrated circuit 112. Then, integrated circuit 112 may: verify that the embedded operating system, the data and the configuration are authorized using the authorization information; and optionally determine that the embedded operating system, the data and the configuration are different from previously received versions based on the anti-replay information. (This last operation may be optional because, during a software update, the same operating system and data configuration may be updated, such that a previously received version may be accepted.) As described further below with reference to FIGS. 5 and 7, note that integrated circuit 112 may facilitate a software update or provisioning of software by providing a number to processor 116. In addition, the number may be a random number, a value derived from the random number, a value from a monotonic counter, and/or a hash of the random number, and the number may only be used one time (which is sometimes referred to as a 'nonce').

Note that a monotonic counter of sufficient size may also be acceptable as a nonce for anti-replay so long as it provides the same properties as a 'random nonce'. The former implies 'use once only,' while the latter implies 'unpredictable and use once only." Anti-replay typically only requires a 'nonce.' Consequently, in the security technique a random nonce may be used because of an extended attacker model. In particular: using a random nonce, and sending its hash aims at protecting against someone 'rewriting' the primary non-volatile memory. The security technique may purposefully expose only the hash of the nonce, making it virtually impossible for an attacker to know the nonce and write the valid information of a previous anti-replay token into the first non-volatile memory. However, in case this scenario is not a threat or if this threat is covered by some other mechanism, the value from a counter can be used.

Thus, non-volatile memory 114 may store limited information that can be used to securely receive the embedded operating system, the data and the configuration from another, potentially unsecure or untrusted source, such as non-volatile memory 118. In this way, the size of non-volatile memory 114 may be significantly reduced, thereby reducing the complexity, the size and the cost of electronic device 100.

Figure 2:
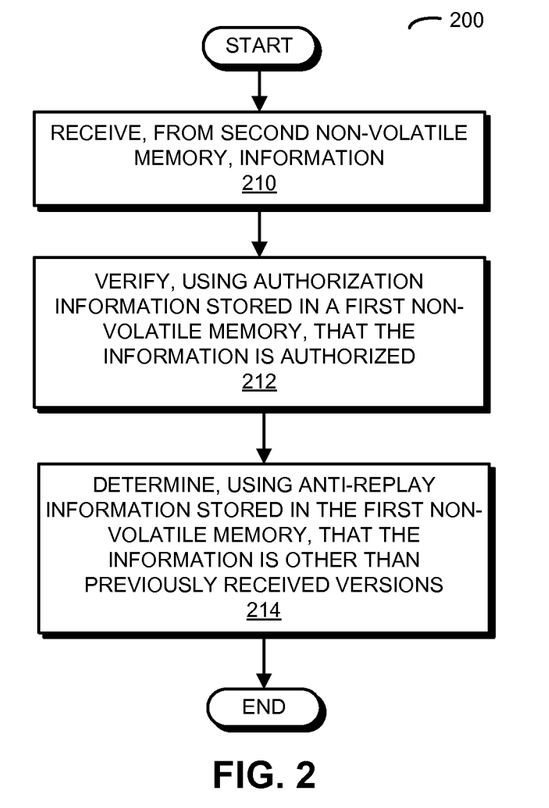
FIG. 2 is a flow diagram illustrating a method for securely booting the electronic device of FIG. 1 in accordance with an embodiment of the present disclosure.

We now describe embodiments of a method. FIG. 2 presents a flow diagram illustrating a method 200 for securely booting electronic device 100 (FIG. 1), which may be performed by an integrated circuit in electronic device 100 in FIG. 1 (and/or a program module executed by the integrated circuit). During operation, the integrated circuit receives, from second non-volatile memory (associated with a processor), information (operation 210), including: an embedded operating system of the integrated circuit, data associated with the integrated circuit, and a configuration of the integrated circuit. Then, the integrated circuit verifies, using authorization information stored in first non-volatile memory (associated with the integrated circuit), that the information is authorized (operation 212). Moreover, the integrated circuit determines, using anti-replay information stored in the first non-volatile memory, that the information is different from one or more previously received versions (operation 214).

In some embodiments of method 200, there may be additional or fewer operations. Moreover, the order of the operations may be changed, and/or two or more operations may be combined into a single operation.

In an exemplary embodiment, at least some of the operations in method 200 are performed by a portion of an embedded operating system that executes in the integrated circuit. Alternatively, at least some of the operations in method 200 may be performed by a program module that is executed in an environment (such as the portion of the embedded operating system) of the integrated circuit.

Figure 3:
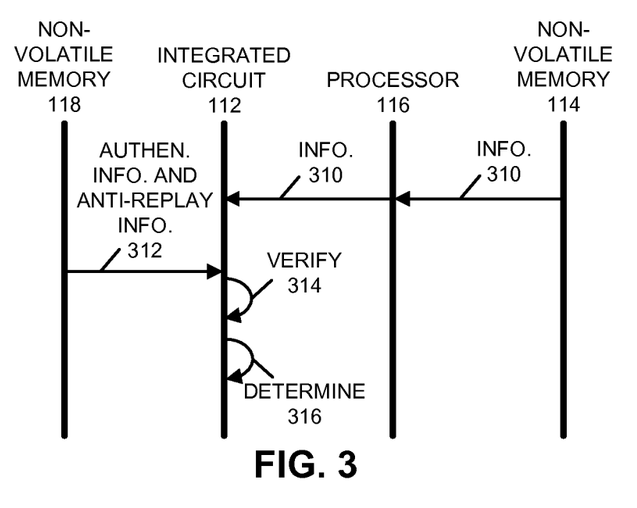
FIG. 3 is a drawing illustrating communication within the electronic device of FIG. 1 in accordance with an embodiment of the present disclosure.

The security technique is further illustrated in FIG. 3, which presents a drawing illustrating communication with electronic device 100 (FIG. 1). In particular, processor 116 receives from non-volatile memory 118, information 310 (including an embedded operating system of integrated circuit 112, data associated with integrated circuit 112 and a configuration of integrated circuit 112), which is provided to integrated circuit 112. Then, integrated circuit 112 accesses authorization information and anti-replay information 312 stored in non-volatile memory 114.

Moreover, integrated circuit 112 verifies 314, using the authorization information, that information 310 is authorized. Furthermore, integrated circuit 112 determines 316, using the anti-replay information, that information 310 is other or different than one or more previously received versions.

In an exemplary embodiment, the majority of the baseband non-volatile memory associated with the integrated circuit is removed and the information previously stored in the baseband non-volatile memory is relocated to the processor's non-volatile memory (i.e., non-volatile memory 118 in FIG. 1). Thus, the majority of the non-volatile memory in the electronic device may be merged into one space. For example, this security technique may reduce the printed-circuit board space by 85%, and may lower the cost of storage in the electronic device by 65%.

While the information (such as the embedded operating system or firmware for the interface) stored on the remote non-volatile memory (i.e., non-volatile memory 118 in FIG. 1) may be encrypted to protect it, there may still be security concerns because the remote non-volatile memory is not secure or is not trusted. These security concerns may be addressed using authentication information (such as authentication credentials or tokens) and anti-replay information. For example, the anti-replay information may include: a nonce, a digest and/or a truncated digest (such as the first 20 B of a hash function, e.g., SHA256). In this way, the remote non-volatile memory may facilitate the loading of authenticated baseband images into the integrated circuit, i.e., secure boot.

In particular, the secure, local non-volatile memory associated with the integrated circuit (i.e., non-volatile memory 114 in FIG. 1) may be 1 kB EEPROM. This secure, local non-volatile memory may be too small to store a baseband loader image for the integrated circuit. Consequently, the file system may be moved to the remote non-volatile memory, and when it is loaded to integrated circuit 112 it may be stored in volatile memory (not shown), such as RAM, associated with integrated circuit 112 (FIG. 1). Instead, the secure, local non-volatile memory may implement a simplified file system with multiple functions, such as factory/user-data partitions, etc. For example, there may be one header and up to four partitions. The first page (i.e., address 0) may include the header, which specifies the number of partitions and the absolute page number of the index table for each partition. Moreover, each partition may include an index table and multiple data files, which, in turn, may be mapped to one or more items. As discussed further below, the header, files and index tables may be checksum protected (32 bits) and dynamic wear-leveling may be enabled for each partition.

As an illustration, an example of the partition layout is shown in Table 1, and an example of a header is shown in Table 2. Note that each data file may have an entry (which may be two bytes) in an index table, which specifies the file identifier, the size of this file and the start page of that file. The number of files supported for each partition may be limited by the number of bits for file identifiers (e.g., for 5 bits there are 32 file identifiers) and the number of entries in the index table, i.e. size of the index table. An example of an index table is shown in Table 3.

TABLE 1

| | Content |
|---|---|
| Header | Magic word, index and start page for each index table |
| Partition #1 | Information generated during factor environment |

TABLE 1-continued

| | Content |
|---|---|
| Partition #2 | Data that may be written in customer use cases |
| Partition #3 | Reserved |
| Partition #4 | Reserved |

TABLE 2

| | |
|---|---|
| Magic Word | Validate the existence of the EEPROM |
| Version | Version-control the layout |
| Meta-Information for Index Table | Bits[7:6]: partition identifier |
| | Bits[5:0]: start page of the index table |

TABLE 3

| Bits 15:11 | Bits 10:5 | Bits 4:0 |
|---|---|---|
| File identifier 1 | Start page of the file (0-63 pages) | File size (maximum is 32 pages) |
| File identifier 2 | Start page of the file (0-63 pages) | File size (maximum is 32 pages) |
| File identifier n | Start page of the file (0-63 pages) | File size (maximum is 32 pages) |

Moreover, the electronic device may encrypt sensitive files stored in the remote non-volatile memory and/or the secure, local non-volatile memory using a hardware-unique key. For example, symmetric encryption (such as encryption compatible with the Advanced Encryption Standard or AES) may be used with a key derived from a hardware-specific encryption key, such as from a manufacturer of the electronic device (which may be used to derive the encryption key). Note that the encryption key may be used to de-encrypt the information received from the remote non-volatile memory.

Figure 4:
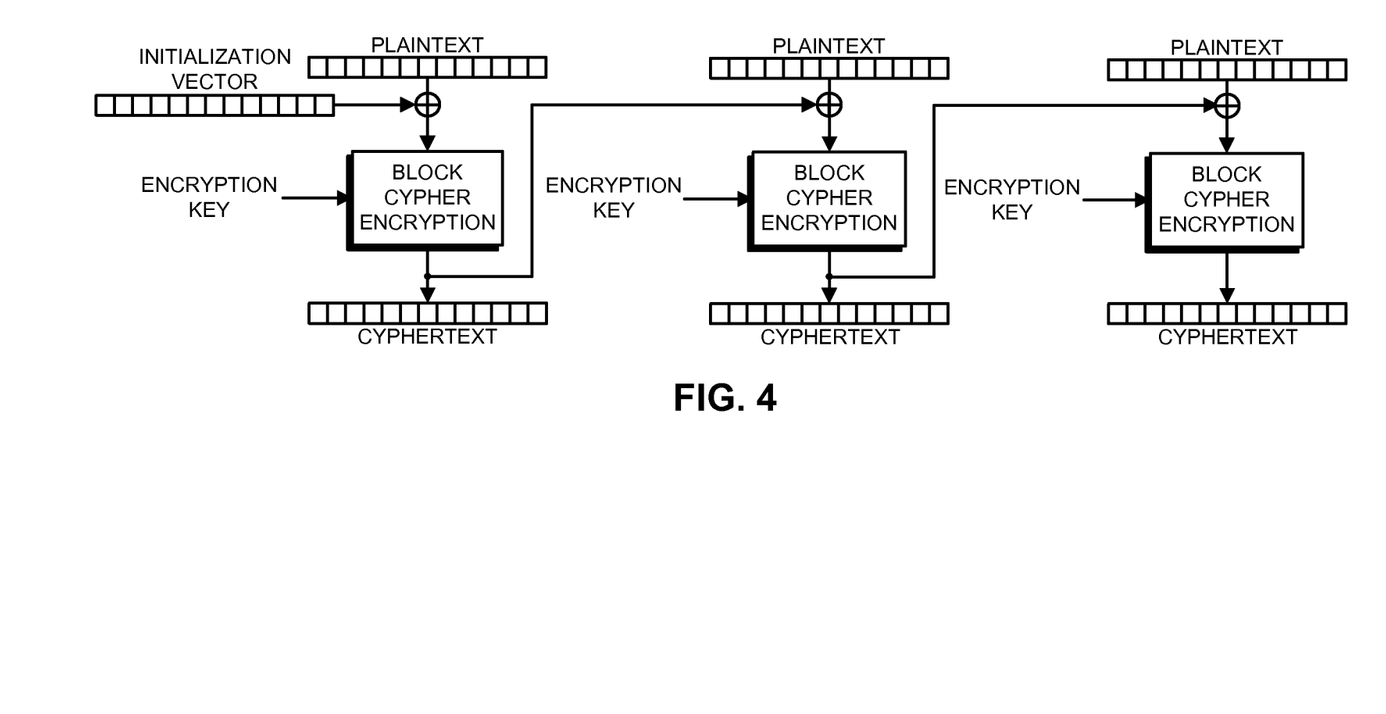
FIG. 4 is a block diagram illustrating encryption in the electronic device of FIG. 1 in accordance with an embodiment of the present disclosure.

In some embodiments, the encryption technique includes AES in cipher block chaining mode or CBC (such as AES-CBC with a 128-bit block) with a derived initialization vector. As shown in FIG. 4, which presents a block diagram illustrating encryption in electronic device 100 in FIG. 1, the encryption technique may achieve unpredictability without saving or storing the initialization vector used for block chaining (which may reduce the size of non-volatile memory 118 in FIG. 1). Instead the wear-leveling counter in the first block of data may be used. Because the encryption depends on the wear-leveling information (the wear-leveling counter and the page), it may be different for each encryption. Thus, for each encryption, the plaintext (or a random nonce) in this first block of data may be changed. Note that that CBC performs an AES operation on the initialization vector exclusive or'ed with the block cipher encryption.

Furthermore, as noted previously, the electronic device may implement dynamic wear leveling, so that writing is spread evenly across all available pages. For example, write counters may be used for wear leveling the secure, local non-volatile memory (e.g., the write location in this non-volatile memory may be changed after a counter value is achieved). In particular, the write count may increase by one per write, and X may specify the maximum number of writes before relocating to a new page in the local non-volatile memory. In some embodiments, when the counter equals mod(X)+1 writes, the write location changes to a different page. Note that the number X may be chosen to minimize the writes for the index table and the wear-out difference among other pages for the end-user use cases.

In addition, as noted previously, a checksum or check value (such as a cyclic redundancy check, e.g., CRC-32) may be appended to the stored information for power-loss detection. This is because data can be corrupted if there is a power failure during a write to the local non-volatile memory. In the event of a checksum failure, a duplicate (shadow) backup copy of the data (which was written separately to the local non-volatile memory) may be read. Alternatively, the consumers of the data and configurations can build a detection and recovery mechanism in a higher layer.

Figure 5:
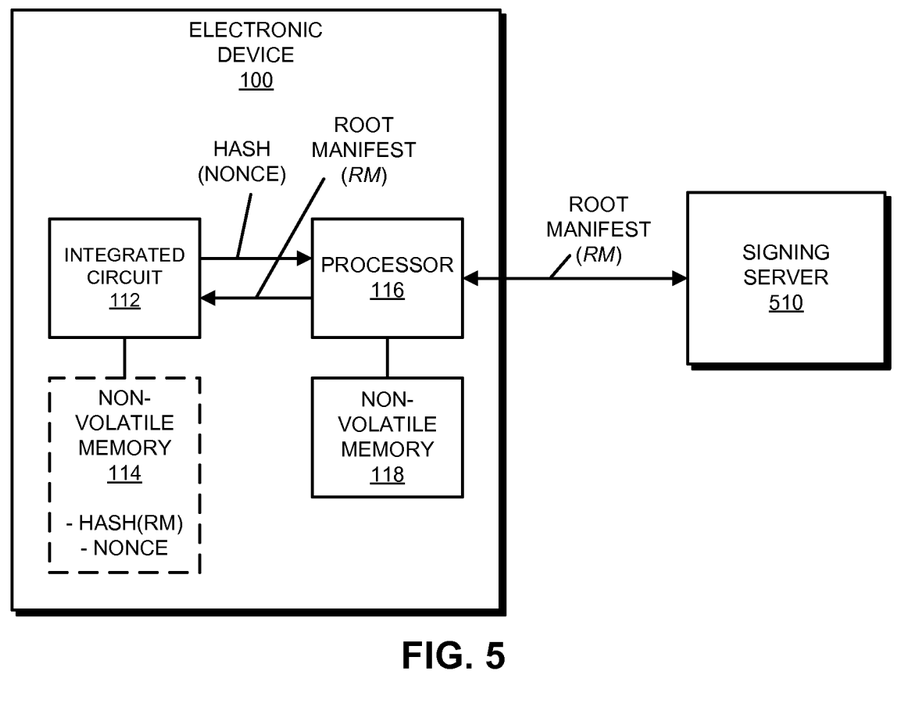
FIG. 5 is a drawing illustrating secure booting of the electronic device of FIG. 1 in accordance with an embodiment of the present disclosure.

We now further describe secure booting and a software update. FIG. 5 presents a drawing illustrating secure booting of electronic device 100 (FIG. 1). In particular, FIG. 5 illustrates a restore flow after a software update, such as when the embedded operating system was updated and stored in non-volatile memory 118. For example, after the software update, the root manifest (such as a number corresponding to the software update) may be updated. The flow in FIG. 5 may be initiated by processor 116. In response, integrated circuit 112 may generate a hash of a nonce in a signing request that is sent to processor 116. Note that the hash function may be SHA256.

Then, processor 116 may send the hash of the nonce to a signing server 510. In response, signing server 510 may provide the root manifest, which is digitally signed (to reduce the likelihood of any tampering) with the hash of the nonce (and, more generally, a credential token) for authentication.

Next, processor 116 may send the root manifest to integrated circuit 112, which may validate the nonce (which is an example of the authorization information) and may determine that the root manifest is not for a previous version of the updated software (which is an example of the anti-replay information), and then may save the hash of the root manifest and the nonce in non-volatile memory 114.

Figure 6:
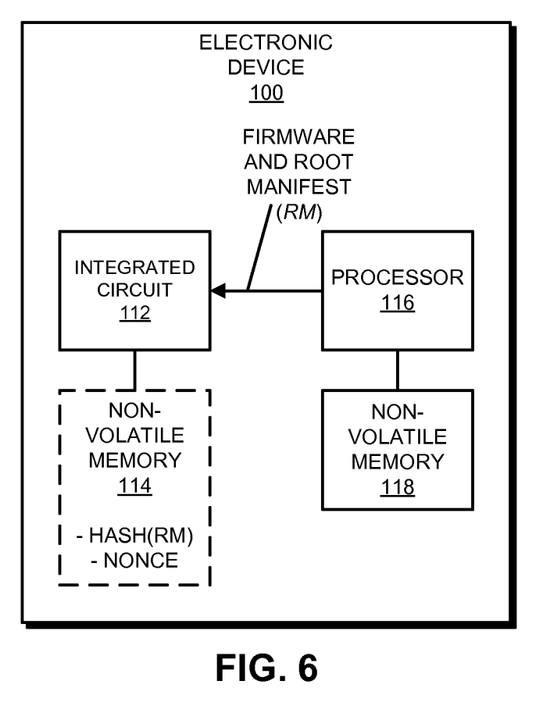
FIG. 6 is a drawing illustrating secure booting of the electronic device of FIG. 1 in accordance with an embodiment of the present disclosure.

FIG. 6 presents a drawing illustrating secure booting of electronic device 100 (FIG. 1). In particular, processor 116 may access the baseband firmware (such as the embedded operating system, the associated data and the configuration) in non-volatile memory 118. Then, processor 116 may provide the baseband firmware, the root manifest, authentication information (such as the nonce, the hash of the nonce, an authentication token or a credential token, etc.) and/or the anti-replay information to integrated circuit 112. In response, integrated circuit 112 may validate the firmware using the nonce against the nonce stored in non-volatile memory 114 (which is an example of the authorization information) and/or may determine that the hash of the root manifest is not a previous version using the hash of the root manifest stored in non-volatile memory 114 (which is an example of the anti-replay information).

Figure 7:
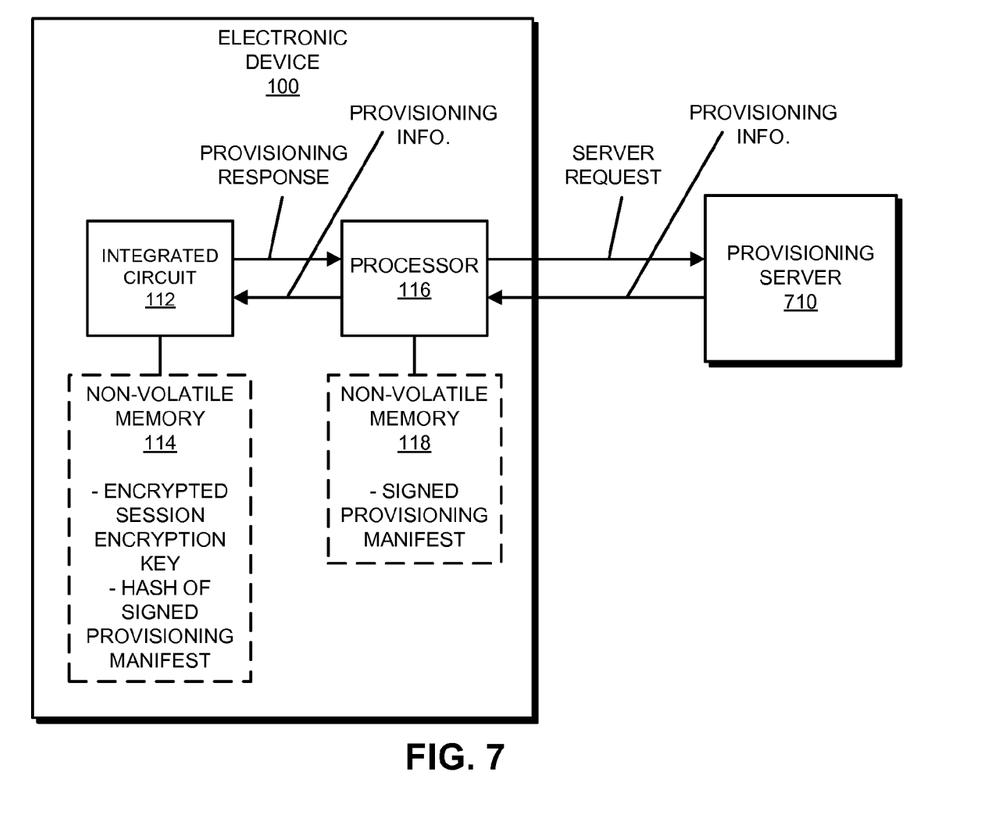
FIG. 7 is a drawing illustrating provisioning of the electronic device of FIG. 1 in accordance with an embodiment of the present disclosure.

FIG. 7 presents a drawing illustrating provisioning of electronic device 100 (FIG. 1). During the provisioning, the flow may be initiated by processor 116, which provides a provisioning request. In the provisioning response, integrated circuit 112 may generate and provide to processor 116 the nonce and the session encryption key, both of which are encrypted using a provisioning public encryption key. In addition, integrated circuit 112 may provide an international mobile equipment identity (IMEI) number or a mobile equipment identifier (MEID). This information may be provided by processor 116 to provisioning server 710 in a server request. Note that the nonce and the session encryption key may be stored in volatile memory in or associated with integrated circuit 112.

Then, provisioning server 710 may provide a provisioning manifest, including a wrapper encryption key (which may be encrypted using the session encryption key) and data that is encrypted using the wrapper encryption key. This provisioning manifest may be stored in non-volatile memory 118. In addition, the provisioning information may be provided to integrated circuit 112. Integrated circuit 112 may verify the nonce (which is an example of the authorization information). Then, integrated circuit 112 may store the session encryption key, which is encrypted using hardware-derived (and, thus, specific to integrated circuit 112) encryption key in non-volatile memory 114. In addition, non-volatile memory 114 may store a hashed version of the signed provision manifest (which may be used subsequently as the anti-replay information), which may be hashed using SHA256.

After the provisioning, processor 116 sends the provisioning manifest to integrated circuit 112, which may determine that the provisioning manifest is not for a previous version (which is an example of the use of the anti-replay information) and may decrypt the provisioning information using the session encryption key (which may be stored on non-volatile memory 114 and encrypted by the hardware-derived key).

Figure 8:
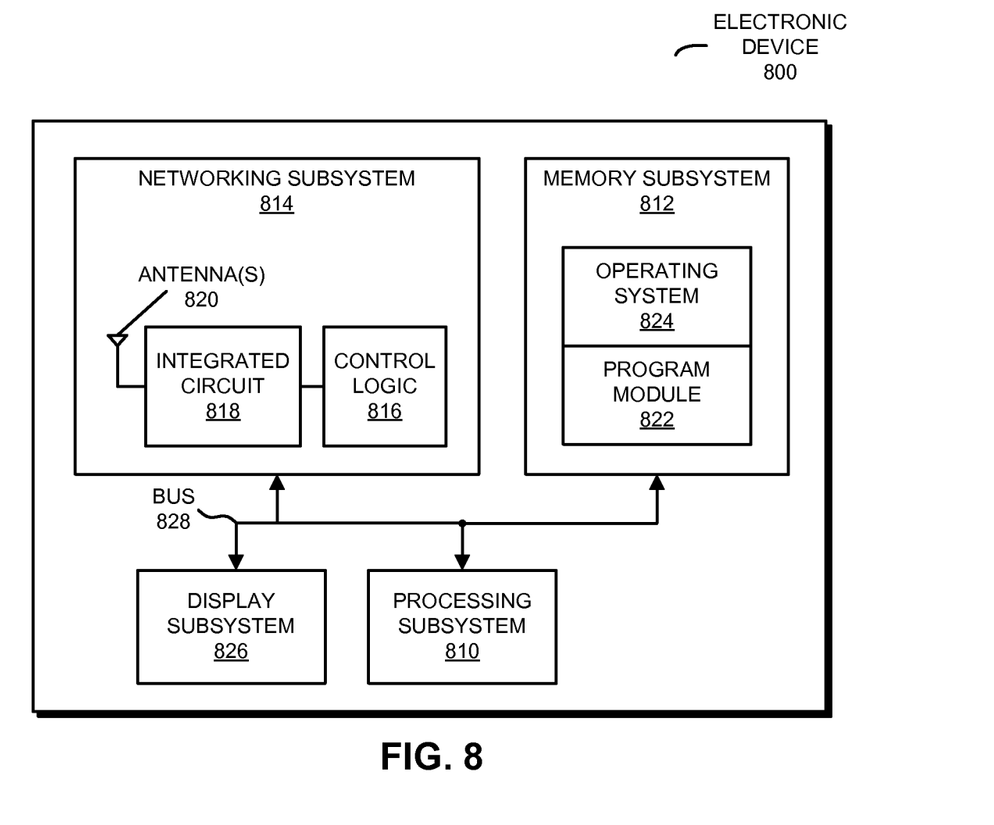
FIG. 8 is a block diagram illustrating the electronic device of FIG. 1 in accordance with an embodiment of the present disclosure.

We now further describe embodiments of the electronic device. FIG. 8 presents a block diagram illustrating electronic device 800. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an integrated circuit 818 and one or more antennas 820. For example, networking subsystem 814 can include: a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections between the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. For example, electronic device 800 can include, but is not limited to, a data collection subsystem, an audio and/or video subsystem, an alarm subsystem, a media processing subsystem, and/or an input/output (I/O) subsystem. Also, although separate subsystems are shown in FIG. 8, in some embodiments, some or all of a given subsystem or component can be integrated into one or more of the other subsystems or component(s) in electronic device 800. For example, in some embodiments program module 822 is included in operating system 824.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 814, such as a radio. Moreover, the integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the security technique may be implemented using program module 822, operating system 824 (such as a driver for integrated circuit 818) or in firmware in integrated circuit 818. Alternatively or additionally, at least some of the operations in the security technique may be implemented in a physical layer, such as hardware in integrated circuit 818.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna;
an integrated circuit, electrically coupled to the antenna, configured to communicate with another electronic device via wireless communication;
first non-volatile memory electrically coupled to the integrated circuit, wherein the first non-volatile memory stores authorization information and anti-replay information;
a processor electrically coupled to the integrated circuit;
second non-volatile memory electrically coupled to the processor, wherein the second non-volatile memory stores: an embedded operating system of the integrated circuit, data associated with the integrated circuit, and a configuration of the integrated circuit; and
wherein, during a secure boot, the integrated circuit is configured to
verify that the embedded operating system, the data and the configuration are authorized using the authorization information; and
determine that the embedded operating system, the data and the configuration are different from previously received versions of the embedded operating system, the data and the configuration, based on the anti-replay information.

2. The electronic device of claim 1, wherein, when verifying the authorization, the integrated circuit compares credentials of the embedded operating system of the integrated circuit, the data, and the configuration to the authorization information.

3. The electronic device of claim 1, wherein the first non-volatile memory has a size less than a predefined threshold value.

4. The electronic device of claim 1, wherein the first non-volatile memory has a size less than that of the second non-volatile memory.

5. The electronic device of claim 1, wherein the anti-replay information is based on a history of update files previously provided to the first non-volatile memory.

6. The electronic device of claim 1, wherein, during a software update:
the processor is configured to receive the embedded operating system, the data and the configuration from another electronic device, and to forward the embedded operating system, the data and the configuration to the integrated circuit; and
the integrated circuit is configured to:
verify that the embedded operating system, the data and the configuration are authorized using the authorization information.

7. The electronic device of claim 6, wherein the integrated circuit is configured to initiate the software update by providing a number to the processor.

8. The electronic device of claim 7, wherein the number is one of: a random number; a value derived from the random number; a value from a monotonic counter; and a hash of the random number; and wherein the number is only used one time.

9. An electronic device, comprising:

an antenna;

an integrated circuit, electrically coupled to the antenna, configured to communicate with another electronic device via wireless communication;

first non-volatile memory electrically coupled to the integrated circuit, wherein the first non-volatile memory stores authorization information and anti-replay information;

a processor electrically coupled to the integrated circuit;

second non-volatile memory electrically coupled to the processor, wherein the second non-volatile memory stores: an embedded operating system of the integrated circuit, data associated with the integrated circuit, and a configuration of the integrated circuit; and wherein, during a secure boot, the integrated circuit executes a program module that:

verifies that the embedded operating system, the data and the configuration are authorized using the authorization information; and determines that the embedded operating system, the data and the configuration are different from previously received versions of the embedded operating system, the data and the configuration, based on the anti-replay information.

10. The electronic device of claim 9, wherein the instructions for verifying the authorization include comparing credentials of the embedded operating system of the integrated circuit, the data, and the configuration to the authorization information.

11. The electronic device of claim 9, wherein the first non-volatile memory has a size less than a predefined threshold value.

12. The electronic device of claim 9, wherein the first non-volatile memory has a size less than that of the second non-volatile memory.

13. The electronic device of claim 9, wherein the anti-replay information is based on a history of update files previously provided to the first non-volatile memory.

14. The electronic device of claim 9, wherein, during a software update, the processor is configured to receive the embedded operating system, the data and the configuration from another electronic device, and to forward the embedded operating system, the data and the configuration to the integrated circuit; and wherein the integrated circuit:

verifies that the embedded operating system, the data and the configuration are authorized using the authorization information.

15. The electronic device of claim 14, wherein the integrated circuit initiates the software update by providing a number to the processor.

16. The electronic device of claim 15, wherein the number is one of: a random number; a value derived from the random number; a value from a monotonic counter; and a hash of the random number; and wherein the number is only used one time.

17. A processor-based method for securely booting an integrated circuit, the method comprising:

receiving, from a second non-volatile memory associated with a processor, an embedded operating system of the integrated circuit, data associated with the integrated circuit, and a configuration of the integrated circuit;

verifying, using authorization information stored in first non-volatile memory associated with the integrated circuit, that the embedded operating system, the data and the configuration are authorized; and determining, using anti-replay information stored in the first non-volatile memory, that the embedded operating system, the data and the configuration are different from previously received versions of the embedded operating system, the data and the configuration.

18. The method of claim 17, wherein, verifying the authorization involves comparing credentials of the embedded operating system of the integrated circuit, the data, and the configuration to the authorization information.

19. The method of claim 17, wherein the first non-volatile memory has a size less than that of the second non-volatile memory.

20. The method of claim 17, wherein the anti-replay information is based on a history of update files previously provided to the first non-volatile memory.

* * * * *